United States Patent
Russo et al.

(10) Patent No.: US 11,155,271 B1
(45) Date of Patent: *Oct. 26, 2021

(54) SYSTEM AND METHOD OF REDUCING VEHICLE COLLISIONS BASED ON DRIVER RISK GROUPS

(71) Applicant: BlueOwl, LLC, San Francisco, CA (US)

(72) Inventors: Micah Wind Russo, Oakland, CA (US); Eric Dahl, Newman Lake, WA (US); Theobolt N. Leung, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/892,812

(22) Filed: Jun. 4, 2020

Related U.S. Application Data

(63) Continuation of application No. 16/203,244, filed on Nov. 28, 2018, now Pat. No. 10,703,378.

(51) Int. Cl.
*B60W 40/09* (2012.01)
*G06F 16/29* (2019.01)
*G06F 16/248* (2019.01)

(52) U.S. Cl.
CPC .......... *B60W 40/09* (2013.01); *G06F 16/248* (2019.01); *G06F 16/29* (2019.01)

(58) Field of Classification Search
CPC ....... B60W 40/09; G06F 16/248; G06F 16/29
See application file for complete search history.

(56) References Cited

U.S. PATENT DOCUMENTS

| | | | |
|---|---|---|---|
| 9,615,213 B2 | 4/2017 | Tibbitts et al. | |
| 9,805,601 B1 | 10/2017 | Fields et al. | |
| 10,029,696 B1 | 7/2018 | Ferguson | |
| 10,445,758 B1 | 10/2019 | Bryer et al. | |
| 2007/0257804 A1 | 11/2007 | Gunderson et al. | |
| 2012/0072241 A1 | 3/2012 | Krause et al. | |
| 2014/0113619 A1* | 4/2014 | Tibbitts | B60W 40/09 455/419 |
| 2014/0195272 A1* | 7/2014 | Sadiq | G06Q 40/08 705/4 |

(Continued)

*Primary Examiner* — Omer S Khan
(74) *Attorney, Agent, or Firm* — Faegre Drinker Biddle & Reath LLP

(57) ABSTRACT

Systems and methods for reducing vehicle collisions based on driver risk groups are provided. A plurality of vehicle operators may be classified into a driver risk group based on one or more attributes (e.g., location, workplace, school, demographic, hobby, interest, etc.) shared by the plurality of vehicle operators. Vehicle sensor data (e.g., speed data, acceleration data, braking data, cornering data, following distance data, turn signal data, seatbelt use data, etc.) associated with each of the plurality of vehicle operators of the driver risk group may be analyzed. Based on the analysis of the vehicle sensor data, one or more indicia of safe driving behavior associated with the driver risk group may be identified. In response to a third-party query regarding a vehicle operator in the driver risk group, an indication of the safe driving behavior associated with the driver risk group may be provided to the third party.

20 Claims, 4 Drawing Sheets

(56) References Cited

U.S. PATENT DOCUMENTS

| | | | | |
|---|---|---|---|---|
| 2015/0025917 A1* | 1/2015 | Stempora | ............ | G06K 9/0061 |
| | | | | 705/4 |
| 2015/0161738 A1 | 6/2015 | Stempora | | |
| 2016/0288797 A1* | 10/2016 | Takahashi | .............. | G07C 5/008 |
| 2017/0098231 A1 | 4/2017 | Dietrich | | |
| 2019/0135177 A1* | 5/2019 | Farrell | .................. | G09B 19/00 |

* cited by examiner

SYSTEM AND METHOD OF REDUCING VEHICLE COLLISIONS BASED ON DRIVER RISK GROUPS

This application claims priority to U.S. patent application Ser. No. 16/203,244 filed Nov. 28, 2018, incorporated by reference herein for all purposes.

FIELD OF THE DISCLOSURE

The present disclosure generally relates to vehicle safety and, more particularly, to reducing vehicle collisions based on driver risk groups.

BACKGROUND

Many vehicle accidents occur within a driver's community. While drivers generally would prefer their communities be safer for driving, individual drivers currently have no way to influence or improve the driving behaviors of other drivers in their communities. However, if made aware of driving trends within their communities, drivers may be motivated to improve their driving to improve the safety of the community as a whole

SUMMARY

In one aspect, a computer-implemented method of reducing vehicle collisions based on driver risk groups is provided. The method comprises: classifying, by a processor, a plurality of vehicle operators into a driver risk group based on one or more attributes shared by the plurality of vehicle operators, analyzing, by a processor, vehicle sensor data associated with each of the plurality of vehicle operators of the driver risk group, identifying, by a processor, based on the analysis of the vehicle sensor data, one or more indicia of safe driving behavior associated with the driver risk group, and providing, by a processor, in response to a third-party query regarding a vehicle operator in the driver risk group, an indication of the safe driving behavior associated with the driver risk group.

In another aspect, a computer system for reducing vehicle collisions based on driver risk groups is provided. The computer system comprises one or more processors and one or more memories storing instructions. The instructions, when executed by the one or more processors, cause the computer system to: classify a plurality of vehicle operators into a driver risk group based on one or more attributes shared by the plurality of vehicle operators, analyzing vehicle sensor data associated with each of the plurality of vehicle operators of the driver risk group, identifying, based on the analysis of the vehicle sensor data, one or more indicia of safe driving behavior associated with the driver risk group, and provide, in response to a third-party query regarding a vehicle operator in the driver risk group, an indication of the safe driving behavior associated with the driver risk group.

In still another aspect, a computer-readable storage medium having stored thereon a set of instructions for reducing vehicle collisions based on driver risk groups is provide. The instructions are executable by a processor, and comprise instructions for: classifying a plurality of vehicle operators into a driver risk group based on one or more attributes shared by the plurality of vehicle operators, analyzing vehicle sensor data associated with each of the plurality of vehicle operators of the driver risk group, identifying, based on the analysis of the vehicle sensor data, one or more indicia of safe driving behavior associated with the driver risk group, and providing, in response to a third-party query regarding a vehicle operator in the driver risk group, an indication of the safe driving behavior associated with the driver risk group.

DETAILED DESCRIPTION

Figure 1A:
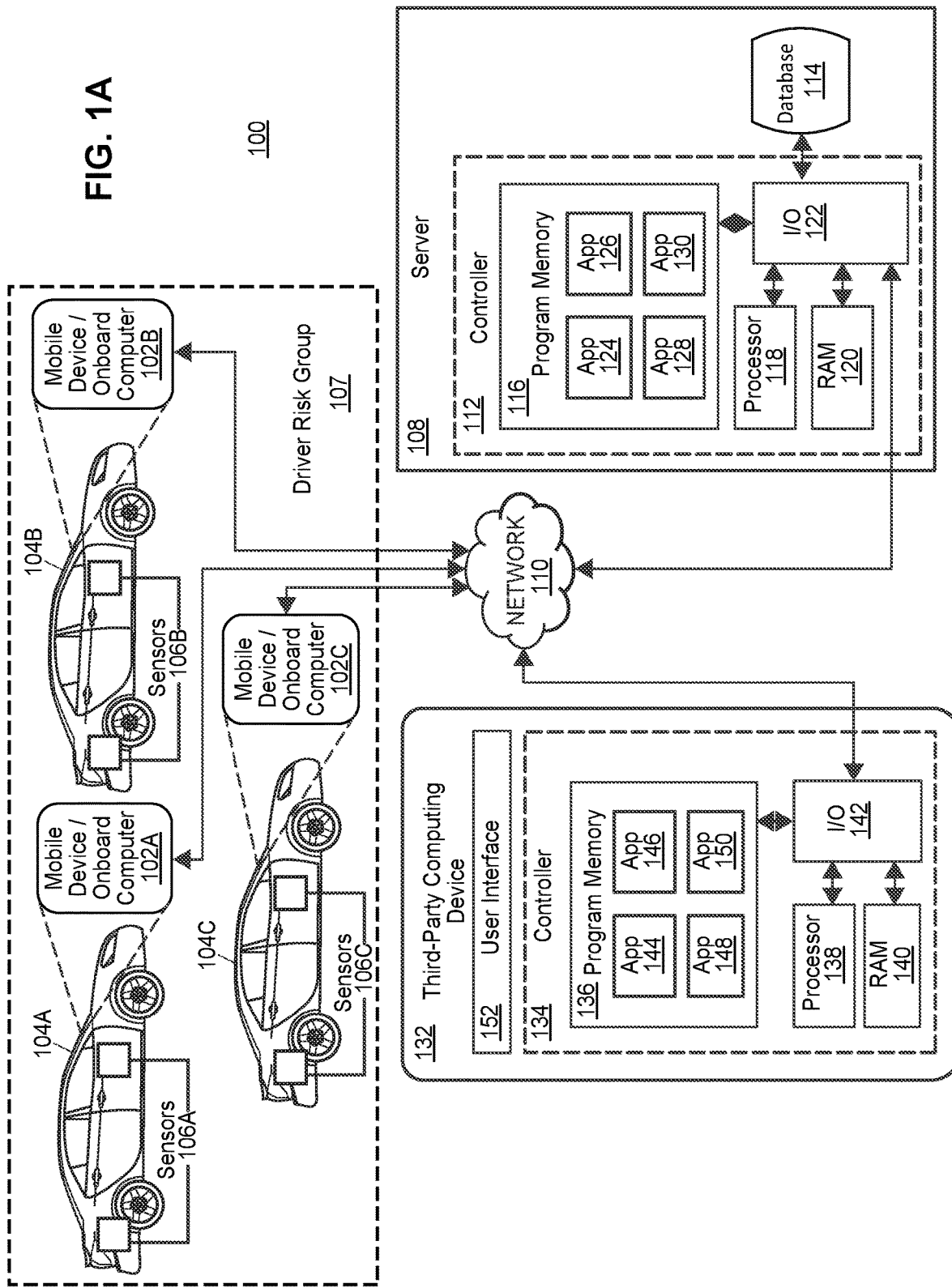
FIG. 1A illustrates an exemplary computer system for reducing vehicle collisions based on driver risk groups, in accordance with some embodiments.

Many vehicle accidents occur within a driver's community. While drivers generally would prefer their communities be safer for driving, individual drivers currently have no way to influence or improve the driving behaviors of other drivers in their communities. However, if made aware of driving trends within their communities, drivers may be motivated to improve their driving to improve the safety of the community as a whole. Accordingly, collisions that occur between drivers in the community may be reduced.

Systems and methods of reducing vehicle collisions based on driver risk groups are provided herein. Drivers may be sorted into driver risk groups based on communities of which they are a part and other shared characteristics between drivers. For example, drivers may be sorted into driver risk groups based on where they live (e.g., street, neighborhood city, state, etc.), based on where they work, based on shared demographic characteristics, based on where they go to school, based on shared hobbies or interests, etc. In some instances, a driver may be part of multiple driver risk groups. Vehicle telematics data (e.g., vehicle sensor data, such as: speed data, acceleration data, braking data, cornering data, following distance data, turn signal data, seatbelt use data, etc.) associated with drivers who are part of a particular driver risk group may be captured by sensors associated with vehicles and/or sensors associated with mobile devices disposed therein. This vehicle telematics data may be analyzed to categorize the overall safe driving of the community. In some instances, categorizing the overall safe driving of the community may include associating a score or rating with a particular driver risk group. Drivers may be notified and/or updated of the overall safe driving of individuals in driver risk groups to which they belong, and may in turn be motivated to drive more safely in order to improve the safety of a group, or in order to maintain a group's existing high standards for safe driving.

Furthermore, in some instances, an indication of the safe driving of a driver risk group may be provided to a third party such as, e.g., a vehicle rental service, a used car dealership, an insurance company, etc., which may in turn provide rewards, discounts, access to certain programs, or other incentives to individuals who are part of driver risk groups that drive safely. For example, drivers from a particular neighborhood may receive a reward from these third parties based on the percentage of drivers in that group who drive at a safe speed, e.g., over the course of a certain amount of time, or with a certain frequency. In some instances, the rewards may be comparative or competitive. For instance, drivers who are fans of one sports team may receive a reward based on whether they drive more safely than drivers who are fans of a rival sports team. Furthermore, the rewards may include a challenge component, e.g., rewards based on which community drives more safely over the course of a month or year. In some examples, groups may track their progress against other groups via a mobile or web application, which could include a leaderboard.

Referring now to FIG. 1A, an exemplary computer system 100 for reducing vehicle collisions based on driver risk groups is illustrated, in accordance with some embodiments. The high-level architecture illustrated in FIG. 1A may include both hardware and software applications, as well as various data communications channels for communicating data between the various hardware and software components, as is described below.

As shown in FIG. 1A, a plurality of mobile devices and/or on-board computers 102A, 102B, 102C (shown in greater detail at FIG. 1B) associated with respective vehicles 104A, 104B, 104C (which may be, e.g., cars, trucks, boats, motorcycles, motorized scooters, or any other vehicles) may interface with respective sensors 106A, 106B, 106C, which may capture vehicle telematics data and other suitable data associated with their respective vehicles 104A, 104B, 104C. The operators of the vehicles 104A, 104B, 104C may collectively be referred to as a driver risk group 107. The vehicle operators of the driver risk group 107 may share one or more attributes with one another, or may otherwise be part of a shared community. Although only three vehicles 104A, 104B, 104C are shown in the driver risk group 107 in FIG. 1A, there may be any number of vehicles in a driver risk group 107 in various embodiments.

Figure 2C:
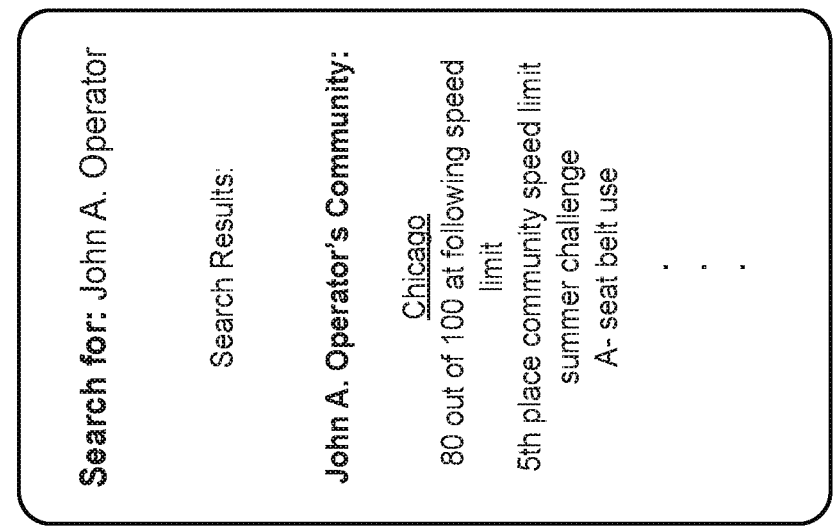
FIGS. 2A-2C illustrate several exemplary user interface displays, in accordance with some embodiments.
Figure 2B:
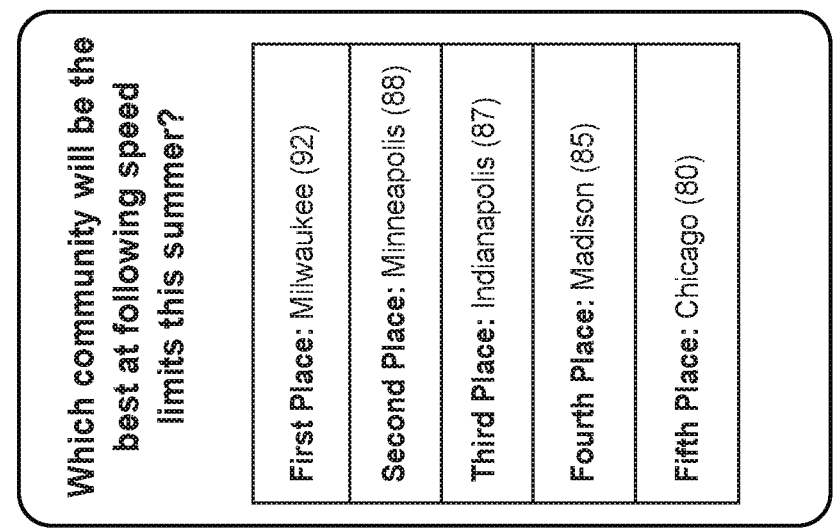
Figure 2A:
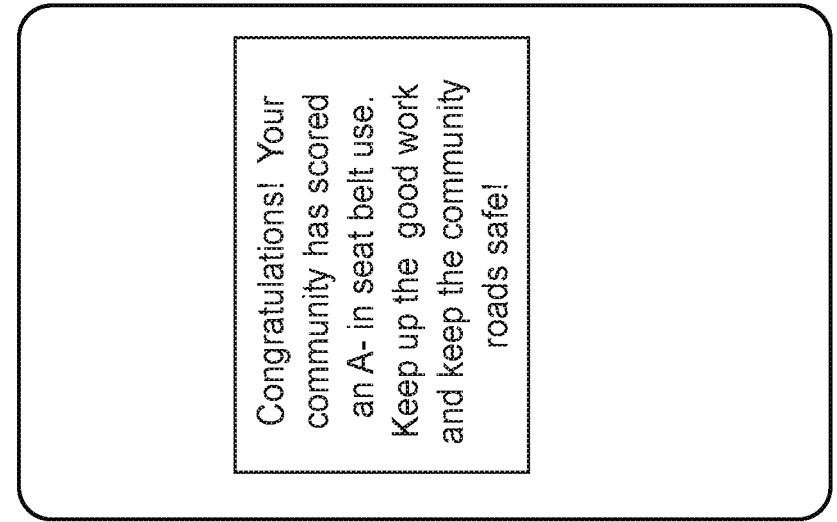

The mobile devices and/or on-board computers 102A, 102B, 102C may be configured to communicate the captured sensor data to a server 108 via a network 110. By analyzing this captured sensor data, the server 108 may identify indications of safe driving behavior by vehicle operators associated with the driver risk group 107. In some embodiments, the server 108 may provide a notification or update of safe driving behaviors associated with the driver risk group 107 (e.g., as shown in FIG. 2A) to a mobile device associated with a vehicle operator in the driver risk group 107, such as, for instance, mobile device 102A, 102B, 102C (e.g., via the network 110). Additionally or alternatively, the server 108 may provide an indication of the driver risk group 107's progress in a safe driving competition against other driver risk groups (e.g., as shown in FIG. 2B) to a mobile device associated with a vehicle operator in the driver risk group 107, such as, for instance, mobile device 102A, 102B, 102C (e.g., via the network 110). Upon receiving a third-party query regarding the vehicle operator (e.g., via the network 110), the server 108 may provide an indication of a safe driving behavior associated with the driver risk group 107 to a third-party computing device 132 (e.g., via the network 110) for display via a user interface 152, e.g., as shown in FIG. 2C.

As shown in FIG. 1A, the server 108 may include a controller 112 that may be operatively connected to the one or more databases 114 via a link, which may be a local or a remote link. The one or more databases 114 may be adapted to store data related to, for instance, driver risk groups and associated characteristics/communities/attributes, vehicle operators in each driver risk group, vehicle telematics data associated with various vehicle operators in each driver risk group, vehicle telematics data trends and/or thresholds indicating safe driving behaviors, various scores and/or categorizations of safe driving behaviors in each driver risk group, various competitions between driver risk groups, third parties to which driver risk group information may be provided, etc. It should be noted that, while not shown, additional databases may be linked to the controller 112. Additionally, separate databases may be used for various types of information, in some instances, and additional databases (not shown) may be communicatively connected to the server 108 via the network 110.

The controller 112 may include one or more program memories 116, one or more processors 118 (which may be, e.g., microcontrollers and/or microprocessors), one or more random-access memories (RAMs) 120, and an input/output (I/O) circuit 122, all of which may be interconnected via an address/data bus. Although the I/O circuit 122 is shown as a single block, it should be appreciated that the I/O circuit 122 may include a number of different types of I/O circuits. The program memory 116 and RAM 120 may be implemented as semiconductor memories, magnetically readable memories, optically readable memories, or biologically readable memories, for example. Generally speaking, the program memory 116 and/or the RAM 120 may respectively include one or more non-transitory, computer-readable storage media. The controller 112 may also be operatively connected to the network 110 via a link.

The server 108 may further include a number of various software applications 124, 126, 128, 130 stored in the program memory 116. Generally speaking, the applications may perform one or more functions related to, inter alia, classifying vehicle operators into driver risk groups based on attributes shared by the vehicle operators, analyzing vehicle sensor data associated with vehicle operators of a driver risk group, identifying indications of safe driving behavior associated with a driver risk group, receiving third-party queries, providing indications of safe driving behavior associated with driver risk group to third parties, generating user interface displays indicating safe driving behaviors associated with driver risk groups and results of driver risk group competitions, etc. For example, one or more of the applications 124, 126, 128, 130 may perform at least a portion of any of the method 300 shown in FIG. 3. The various software applications 124, 126, 128, 130 may be executed on the same processor 126 or on different processors. Although four software applications 124, 126, 128, 130 are shown in FIG. 1A, it will be understood that there may be any number of software applications 124, 126, 128, 130. Further, two or more of the various applications 124, 126, 128, 130 may be integrated as an integral application, if desired.

It should be appreciated that although the server 108 is illustrated as a single device in FIG. 1A, one or more portions of the server 108 may be implemented as one or more storage devices that are physically co-located with the server 108, or as one or more storage devices utilizing different storage locations as a shared database structure (e.g. cloud storage). In some embodiments, the server 108 may be configured to perform any suitable portion of the processing functions remotely that have been outsourced by the on-board computers and/or mobile devices 102A, 102B, 102C.

Turning now to the third-party computing device 132, this computing device may include a user interface 152, as well as controller 134, which may include one or more program memories 136, one or more processors 138 (which may be, e.g., microcontrollers and/or microprocessors), one or more random-access memories (RAMs) 140, and an input/output (I/O) circuit 142, all of which may be interconnected via an address/data bus. Although the I/O circuit 142 is shown as a single block, it should be appreciated that the I/O circuit 142 may include a number of different types of I/O circuits. The program memory 136 and RAM 140 may be implemented as semiconductor memories, magnetically readable memories, optically readable memories, or biologically readable memories, for example. Generally speaking, the program memory 136 and/or the RAM 140 may respectively include one or more non-transitory, computer-readable storage media. The controller 134 may also be operatively connected to the network 110 via a link.

The third-party computing device 132 may further include a number of various software applications 144, 146, 148, 150 stored in the program memory 136. Generally speaking, the applications may perform one or more functions related to, inter alia, receiving queries regarding vehicle operators from a third-party user, transmitting queries regarding vehicle operators to the server 108 (e.g., via the network 110), receiving indications of safe driving behaviors associated with vehicle operators and/or their driving risk groups from the server 108 (e.g., via the network 110), displaying indications of safe driving behaviors associated with vehicle operators and/or their driving risk groups (e.g., via the user interface 152), etc. For example, one or more of the applications 144, 146, 148, 150 may perform at least a portion of any of the method 300 shown in FIG. 3. The various software applications 144, 146, 148, 150 may be executed on the same processor 138 or on different processors 138. Although four software applications 144, 146, 148, 150 are shown in FIG. 1A, it will be understood that there may be any number of software applications 144, 146, 148, 150. Further, two or more of the various applications 144, 146, 148, 150 may be integrated as an integral application, if desired.

Figure 1B:
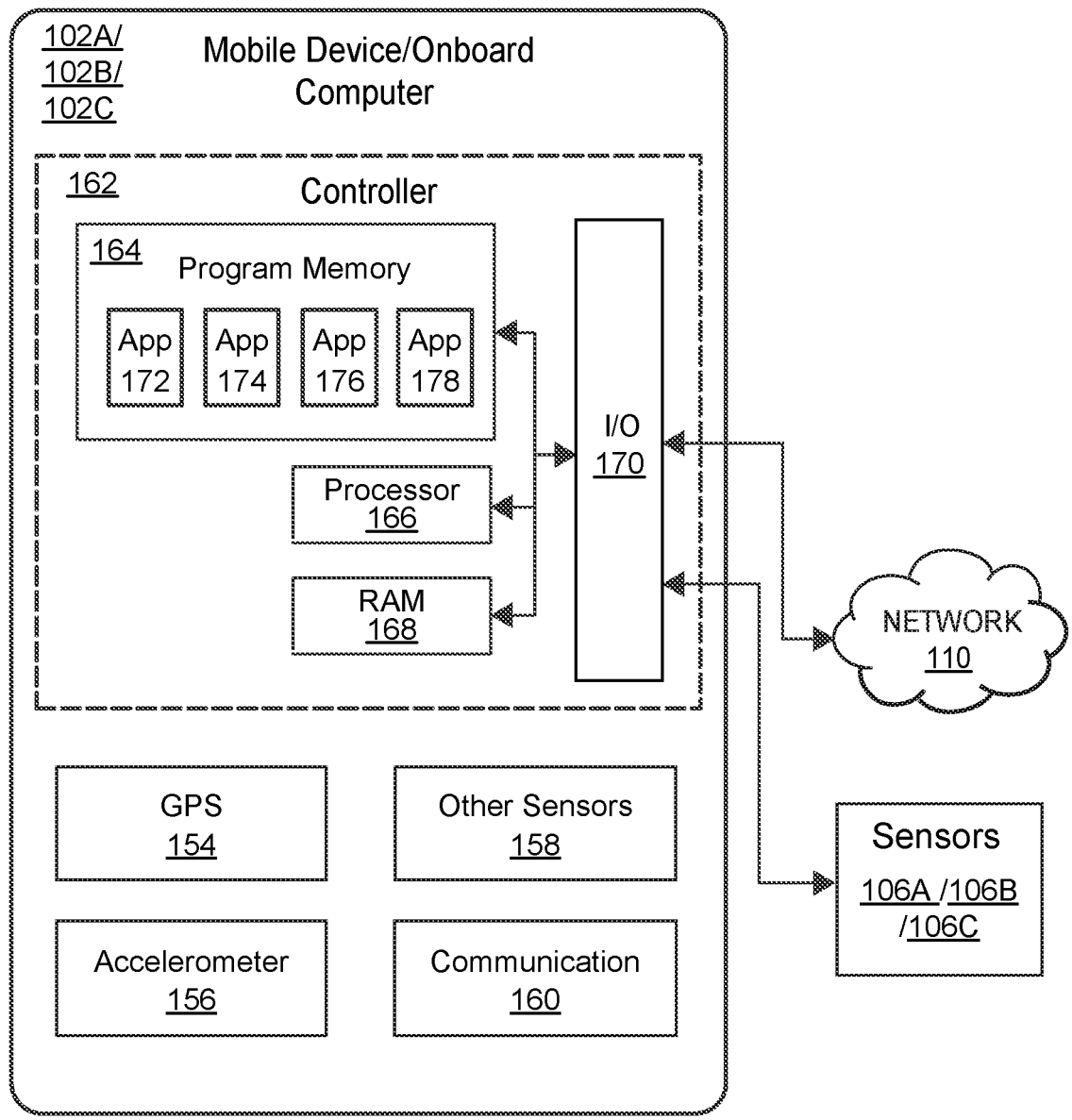
FIG. 1B illustrates an exemplary mobile device and/or onboard computer operable within the system of FIG. 1A, in accordance with some embodiments.

Referring now to FIG. 1B, an exemplary mobile device and/or onboard computer 102A, 102B, 102C associated with a respective vehicles 104A, 104B, 104C is illustrated in greater detail, in accordance with some embodiments. The mobile device and/or onboard computer 102A, 102B, 102C may include one or more of a GPS unit 154, an accelerometer 156, one or more other sensors 158, a communication unit 160, and/or a controller 162.

The GPS unit 154 may be disposed at the mobile device and/or onboard computer 102A, 102B, 102C and may collect data indicating the location of the mobile device and/or onboard computer 102A, 102B, 102C, and/or (e.g., by proxy) the respective vehicle 104A, 104B, 104C. Moreover, in some embodiments the GPS unit 140 may be a separate device disposed within or external to the respective vehicle 104A, 104B, 104C (e.g., one of the sensors 106A, 106B, 106C), and interfacing with the mobile device and/or onboard computer 102A, 102B, 102C. The accelerometer 156 may be disposed at the mobile device and/or onboard computer 102A, 102B, 102C and may collect data indicating the acceleration of the mobile device and/or onboard computer 102A, 102B, 102C and/or (e.g., by proxy) the respective vehicle 104A, 104B, 104C. Moreover, in some embodiments the GPS unit 156 may be a separate device disposed within or external to the vehicle 104A, 104B, 104C (e.g., one of the sensors 106A, 106B, 106C), and interfacing with the mobile device and/or onboard computer 102A, 102B, 102C. In general, the GPS unit 154, an accelerometer 156, one or more other sensors 158, and the sensors 106A, 106B, 106C may be configured to capture vehicle sensor data associated with the vehicle 104A, 104B, 104C, e.g., one or more of speed data, acceleration data, braking data, cornering data, following distance data, turn signal data, seatbelt use data, location data, date/time data, or any other suitable vehicle sensor data. The communication unit 160 may be disposed at the mobile device and/or onboard computer 102A, 102B, 102C and may, e.g., transmit and receive information from external sources such as, e.g., the server 108 and/or the third-party computing device 132, e.g., via the network 110.

As shown in FIG. 1B, the mobile device and/or onboard computer 102A, 102B, 102C may include a controller 162 may include one or more program memories 164, one or more processors 166 (which may be, e.g., microcontrollers and/or microprocessors), one or more random-access memories (RAMs) 168, and an input/output (I/O) circuit 170, all of which may be interconnected via an address/data bus. Although the I/O circuit 170 is shown as a single block, it should be appreciated that the I/O circuit 170 may include a number of different types of I/O circuits. The program memory 164 and RAM 168 may be implemented as semiconductor memories, magnetically readable memories, optically readable memories, or biologically readable memories, for example. Generally speaking, the program memory 164 and/or the RAM 168 may respectively include one or more non-transitory, computer-readable storage media. The controller 162 may also be operatively connected to the network 110 via a link.

The mobile device and/or onboard computer 102A, 102B, 102C may further include a number of various software applications 172, 174, 176, 178 stored in the program memory 164. Generally speaking, the applications may perform one or more functions related to, inter alia, capturing vehicle sensor data associated with vehicle operators; transmitting the vehicle sensor data to the server 108, etc. In some instances, one or more of the applications 172, 174, 176, 178 may perform at least a portion of any of the method 300 shown in FIG. 3. The various software applications 172, 174, 176, 178 may be executed on the same processor 166 or on different processors. Although four software applications 172, 174, 176, 178 are shown in FIG. 1B, it will be understood that there may be any number of software applications 172, 174, 176, 178. Further, two or more of the various applications 172, 174, 176, 178 may be integrated as an integral application, if desired. Additionally, it should be appreciated that in some embodiments, the mobile device and/or onboard computer 102A, 102B, 102C may be configured to perform any suitable portion of the processing functions described as being performed by the server 108.

Turning now to FIGS. 2A, 2B, and 2C, several exemplary user interface displays are illustrated, in accordance with some embodiments. As shown in FIG. 2A, a vehicle operator may be notified and/or updated of save driving behaviors associated with her or her driver risk group via a mobile device notification displayed on a user interface. The mobile device notification may indicate, for instance, a score or rating for the safe driving behavior associated with the driver risk group community. In some instances, receiving notifications as shown in FIG. 2A may inspire or motivate a vehicle operator to drive more safely, or continue to drive safely, to improve or maintain the safe driving behaviors associated with his or her driver risk group.

As shown in FIG. 2B, a leaderboard indicating the safe driving behaviors associated with several driver risk groups may be displayed on a user interface. The leaderboard indicates which driver risk groups (in this case, cities) have scored the highest in a challenge, "Which community will be the best at following speed limits this summer?" Participating in a challenge as shown in FIG. 2B may encourage friendly competition between driver risk groups, motivating vehicle operators associated with each group to drive more safely.

As shown in FIG. 2C, in response to a third-party query regarding a vehicle operator in the driver risk group, one or more indicia of safe driving behavior associated with the driver risk group may be provided to the third party via a user interface. For example, as shown in FIG. 2C, a third party may search for a particular vehicle operator ("John A. Operator"), and search results indicating one or more driver risk groups (e.g., Chicago) with which the vehicle operator is associated may be provided. The search results further include safe driving behaviors associated with the vehicle operator's driver risk group. In some examples, the third party may in turn provide rewards, incentives, discounts, and/or access to certain selective programs or events to the vehicle operator based on the safe driving behavior associated with the vehicle operator's driver risk group.

Figure 3:
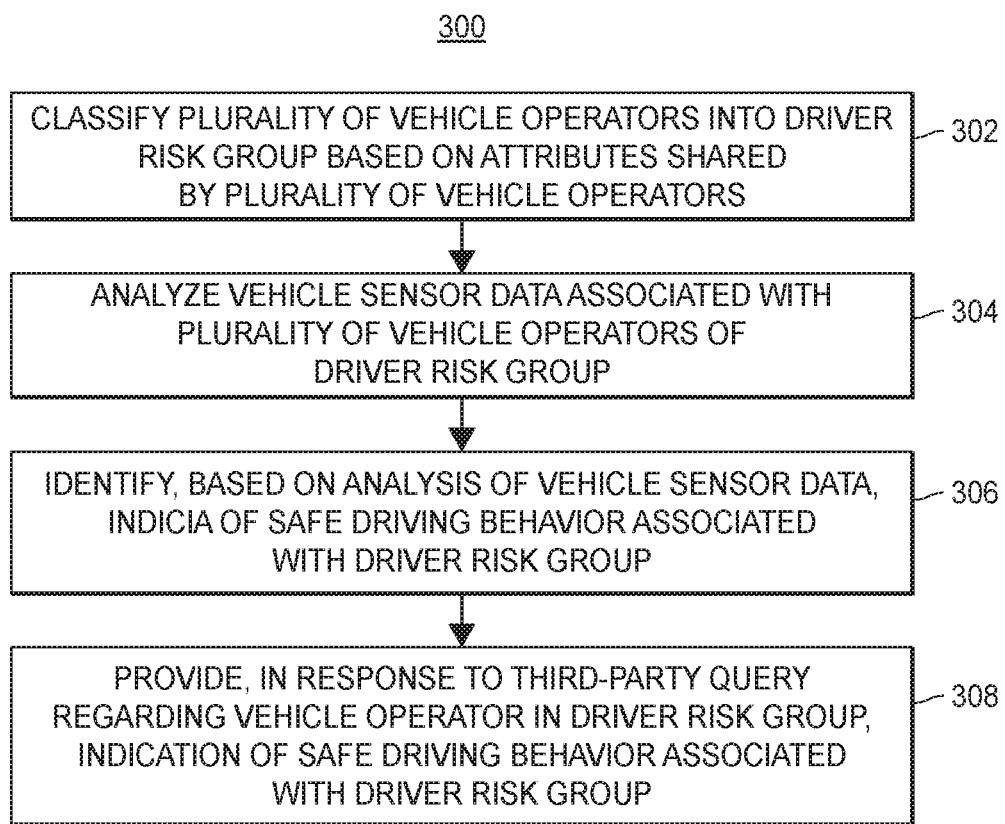
FIG. 3 illustrates a flow diagram of an exemplary computer-implemented method of reducing vehicle collisions based on driver risk groups, in accordance with some embodiments.

Turning now to FIG. 3, a flow diagram of an exemplary computer-implemented method of reducing vehicle collisions based on driver risk groups is illustrated, in accordance with some embodiments. The method 300 can be implemented as a set of instructions stored on a computer-readable memory and executable on one or more processors.

A plurality of vehicle operators may be classified (block 302) into a driver risk group based on attributes shared by the plurality of vehicle operators. These attributes, or characteristics, may indicate communities of which the vehicle operators are a part. These characteristics may include, for instance, location-related characteristics, such as where the vehicle operator lives (e.g., street, neighborhood, city, state, country, etc.) These characteristics may also include workplace-related characteristics, such as, e.g., the vehicle operator's career or field, the employer of the vehicle operator, etc. As another example, these characteristics may include school-related characteristics, such as, e.g., which school the vehicle operator currently attends, the vehicle operator's grade level in school, alumni groups of which the vehicle operator is a part, etc. In some instances, these characteristics may include or hobby-related and/or interest-related characteristics, such as, e.g., sports teams of which the vehicle operators are fans. In some instances, of course, vehicle operators may be grouped into the driver risk group based on any other suitable demographic characteristics.

Vehicle sensor data associated with each of the plurality of vehicle operators of the driver risk group may be analyzed (block 304). The vehicle sensor data associated with the plurality of vehicle operators may include, for instance, speed data, acceleration data, braking data, cornering data, following distance data, turn signal data, seatbelt use data, location data, date/time data, or any other suitable vehicle sensor data. This vehicle sensor data may be analyzed to determine instances in which the vehicle operators exhibit safe driving behaviors (as opposed to unsafe driving behaviors), and these instances of safe driving behavior may be recorded.

For instance, vehicle sensor data indicating that the speed of the vehicle is above a certain threshold speed may indicate an unsafe driving behavior, while vehicle sensor data indicating that the speed of the vehicle is below that speed may indicate a safe driving behavior. Similarly, for example, acceleration at a rate above a certain threshold rate may indicate an unsafe driving behavior, while acceleration below that threshold rate may indicate a safe driving behavior. As another example, braking data may be analyzed to determine instances of "hard" versus "soft" braking, with hard braking indicating an unsafe driving behavior while soft braking indicates a safe driving behavior.

In some instances, multiple types of vehicle sensor data may be combined to determine indications of safe and unsafe driving behavior. For example, location data may be combined with speed data to determine whether a vehicle operator is exceeding local speed limits (an unsafe driving behavior) or following them (a safe driving behavior). As another example, seatbelt use data may be combined with speed data to determine whether the vehicle operator is using a seatbelt while the vehicle is in motion (a safe driving behavior).

Based on the analysis of the vehicle sensor data, one or more indicia of safe driving behavior associated with driver risk group may be identified (block 306). In some examples, the indication of the safe driving behavior of the driver risk group may be a score or rating associated with the driver risk group (e.g., a score of 70 out of 100, A+, four out of five stars, etc.) The score or rating may be based on an overall assessment of the safe driving behaviors associated with the individual vehicle operators of the group, which may be, for instance, averaged or weighted in a number of different ways. Additionally or alternatively, the indication of the safe driving behavior of the driver risk group may describe specific safe driving behaviors at which the driver risk group excels (e.g., great at following speed limits, always wearing seat belts, etc.) Moreover, the indication of safe driving behavior associated with the driver risk group may be a combination of a score and a description, e.g., Neighborhood X receives an A+ in safe braking, an A– at safe cornering, B+ at following speed limits, etc. The identified indication of safe driving behavior associated with the driver risk group may be provided to vehicle operators who are part of the driver risk group, e.g., via a user interface display (as shown in FIG. 2A). Accordingly, when notified and/or updated of the driver risk group's score, rating, or description, vehicle operators may be motivated to drive more safely in order to improve the safety of the community, or in order to maintain the community's existing high standards for safe driving.

In some instances, the indication of safe driving behavior associated with the driver risk group as a whole may be achieved based on a number or a percentage of vehicle operators of the driver risk group who are associated with vehicle sensor data indicative of a safe driving behavior (e.g., 90% of drivers from a certain school have exhibited safe cornering behaviors within the past 10 days) and/or a frequency with which vehicle operators of the driver risk group are associated with vehicle sensor data indicative of safe driving behavior (e.g., drivers from a certain workplace use their seat belts every time they operate a vehicle).

In some instances, the indication of safe driving behavior associated with the driver risk group may be comparative. For example, the vehicle sensor data associated with a first driver risk group may be compared to vehicle sensor data associated with a second driver risk group. For instance, a driver risk group including drivers from one city may be compared to a driver risk group including drivers from another city to determine which group more consistently maintains speed limits. In some examples, the indication of safe driving behavior associated with the driver risk group may be based on the driver risk group's completion of a challenge. The challenge may include criteria for completion (e.g., 90% of drivers in the driver risk group must wear their seat belts every day in May). In some instances, the challenge may be a comparative challenge between vehicle operators of one driver risk group and vehicle operators of another driver risk group (e.g., which driver risk group can reach 1000 trips with safe cornering first, the White Sox fan community or the Cubs fan community?). Results from a comparative and/or challenge-based determination of safe driving behavior may be displayed on a leaderboard or otherwise presented to vehicle operators, e.g., via a user interface display as shown in FIG. 2B, to encourage safe driving via friendly competition between communities.

In response to a third-party query regarding a vehicle operator in the driver risk group, one or more indicia of safe driving behavior associated with the driver risk group may be provided to the third party (block 308), e.g., via a user interface display as shown in FIG. 2C. The third-party query may originate from a business of which the vehicle operator is a customer or a potential customer. For instance, a vehicle rental service from which the vehicle operator wishes to rent a vehicle may request access to indications of safe driving behavior associated with the vehicle operator's driver risk group. As another example, an insurance company may request to access to indications of safe driving behavior associated with the vehicle operator's driver risk group. As still another example, the third-party query may originate from an employer or potential employer of the vehicle operator. For example, a potential employer considering the vehicle operator for a position involving driving, e.g., in the field of trucking, delivery, taxi or limo services, ridesharing services, etc., may request access to indications of safe driving behavior associated with the vehicle operator's driver risk group.

In some examples, the third party may provide rewards, incentives, discounts, and/or access to certain selective programs or events to the vehicle operator based on the safe driving behavior associated with the vehicle operator's driver risk group. For example, the vehicle operator may gain access to a selective program, e.g., an opportunity to rent new or rare vehicles, based on the safe driving behavior associated with the vehicle operator's driver risk group.

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to insured assets before (and/or after) an insurance-related event, including those events discussed elsewhere herein. In return, risk averse insureds may receive discounts or insurance cost savings related to home, renters, personal articles, auto, and other types of insurance from the insurance provider.

In one aspect, data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the foregoing text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within an office environment, or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of reducing vehicle collisions based on driver risk groups, the method comprising:
    classifying a first plurality of vehicle operators into a first driver risk group based on one or more attributes shared by the first plurality of vehicle operators;
    classifying a second plurality of vehicle operators into a second driver risk group based on one or more attributes shared by the second plurality of vehicle operators, the second plurality of vehicle operators including at least one vehicle operator not included in the first plurality of vehicle operators;
    providing a safe driving group challenge to the first plurality of vehicle operators and to the second plurality of vehicle operators;
    capturing, via at least one sensor of an accelerometer and a GPS sensor, vehicle sensor data associated with vehicles operated by the first plurality of vehicle operators and by the second plurality of vehicle operators;
    analyzing vehicle sensor data associated with the first plurality of vehicle operators of the first driver risk group to determine a first group challenge performance associated with the first plurality of vehicle operators corresponding to the safe driving group challenge;
    analyzing vehicle sensor data associated with the second plurality of vehicle operators of the second driver risk group to determine a second group challenge performance associated with the second plurality of vehicle operators corresponding to the safe driving group challenge;
    identifying a first indication of safe driving behavior associated with the first driver risk group based at least in part upon comparing the first group challenge performance and the second group challenge performance; and presenting the first indication of safe driving behavior to a vehicle operator in the first driver risk group via at least a display associated with the vehicle operator.

2. The computer-implemented method of claim 1, further comprising:
providing, in response to a query regarding the vehicle operator in the first driver risk group, the first indication of safe driving behavior configured to assist the determination of at least one selected from a group consisting of reward, incentive, and discount for the vehicle operator.

3. The computer-implemented method of claim 1, further comprising:
presenting the first group challenge performance and the second group challenge performance to the first plurality of vehicle operators and the second plurality of vehicle operators to encourage improvement of driving behaviors.

4. The computer-implemented method of claim 3, wherein the presenting the first group challenge performance and the second group challenge performance includes presenting the first group challenge performance and the second group challenge performance via a scoreboard.

5. The computer-implemented method of claim 1, wherein the one or more attributes shared by the first plurality of vehicle operators includes at least one selected from a group consisting of a location-related attribute, a workplace-related attribute, a school-related attribute, a demographic attribute, a hobby-related attribute, and an interest-related attribute.

6. The computer-implemented method of claim 1, wherein the vehicle sensor data include at least one selected from a group consisting of speed data, acceleration data, braking data, cornering data, following distance data, turn signal data, and seatbelt use data.

7. The computer-implemented method of claim 1, wherein the identifying a first indication of safe driving behavior associated with the first driver risk group includes identifying the first indication of safe driving behavior based further upon comparing the vehicle sensor data associated with the first plurality of vehicle operators of the first driver risk group and the vehicle sensor data associated with the second plurality of vehicle operators of the second driver risk group.

8. The computer-implemented method of claim 1, wherein the identifying a first indication of safe driving behavior associated with the first driver risk group further includes identifying a number of vehicle operators or a percentage of vehicle operators of the first driver risk group whose corresponding vehicle sensor data indicate the safe driving behavior associated with the safe driving group challenge.

9. The computer-implemented method of claim 1, wherein the identifying a first indication of safe driving behavior associated with the first driver risk group further includes identifying an average frequency that the vehicle sensor data of associated with the first plurality of vehicle operators of the first driver risk group indicate the safe driving behavior associated with the safe driving group challenge.

10. A computer system for reducing vehicle collisions based on driver risk groups, the computer system comprising:
one or more processors; and
one or more memories storing instructions that, when executed by the one or more processors, cause the computer system to:
classify a first plurality of vehicle operators into a first driver risk group based on one or more attributes shared by the first plurality of vehicle operators;
classify a second plurality of vehicle operators into a second driver risk group based on one or more attributes shared by the second plurality of vehicle operators, the second plurality of vehicle operators including at least one vehicle operator not included in the first plurality of vehicle operators;
provide a safe driving group challenge to the first plurality of vehicle operators and to the second plurality of vehicle operators;
capture, via at least one sensor of an accelerometer and a GPS sensor, vehicle sensor data associated with vehicles operated by the first plurality of vehicle operators and by the second plurality of vehicle operators;
analyze vehicle sensor data associated with the first plurality of vehicle operators of the first driver risk group to determine a first group challenge performance associated with the first plurality of vehicle operators corresponding to the safe driving group challenge;
analyze vehicle sensor data associated with the second plurality of vehicle operators of the second driver risk group to determine a second group challenge performance associated with the second plurality of vehicle operators corresponding to the safe driving group challenge;
identify a first indication of safe driving behavior associated with the first driver risk group based at least in part upon comparing the first group challenge performance and the second group challenge performance; and
present the first indication of safe driving behavior to a vehicle operator in the first driver risk group via at least a display associated with the vehicle operator.

11. The computer system of claim 10, wherein the one or more memories, when executed by the one or more processors, further cause the computer system to:
provide, in response to a query regarding the vehicle operator in the first driver risk group, the first indication of safe driving behavior configured to assist the determination of at least one selected from a group consisting of reward, incentive, and discount for the vehicle operator.

12. The computer system of claim 10, wherein the one or more memories, when executed by the one or more processors, further cause the computer system to:
present the first group challenge performance and the second group challenge performance to the first plurality of vehicle operators and the second plurality of vehicle operators to encourage improvement of driving behaviors.

13. The computer system of claim 12, wherein to present the first group challenge performance and the second group challenge performance includes to present the first group challenge performance and the second group challenge performance via a scoreboard.

14. The computer system of claim 10, wherein the one or more attributes shared by the first plurality of vehicle operators includes at least one selected from a group consisting of a location-related attribute, a workplace-related attribute, a school-related attribute, a demographic attribute, a hobby related attribute, and an interest-related attribute.

15. The computer system of claim 10, wherein the vehicle sensor data include at least one selected from a group consisting of speed data, acceleration data, braking data, cornering data, following distance data, turn signal data, and seatbelt use data.

16. The computer system of claim 10, wherein to identify the first indication of safe driving behavior associated with the first driver risk group includes to identify the first indication of safe driving behavior based further upon comparing the vehicle sensor data associated with the first plurality of vehicle operators of the first driver risk group and the second vehicle sensor data associated with the second plurality of vehicle operators of the second driver risk group.

17. The computer system of claim 10, wherein to identify a first indication of safe driving behavior associated with the first driver risk group further includes to identify a number of vehicle operators or a percentage of vehicle operators of the first driver risk group whose corresponding vehicle sensor data indicate the safe driving behavior associated with the safe driving group challenge.

18. The computer system of claim 10, wherein to identify a first indication of safe driving behavior associated with the first driver risk group further includes to identify an average frequency that the vehicle sensor data associated with the first plurality of vehicle operators of the first driver risk group indicate the safe driving behavior associated with the safe driving group challenge.

19. A computer-readable storage medium having stored thereon a set of instructions for reducing vehicle collisions based on driver risk groups, executable by a processor, the instructions comprising instructions for:
classifying a first plurality of vehicle operators into a first driver risk group based on one or more attributes shared by the first plurality of vehicle operators;
classifying a second plurality of vehicle operators into a second driver risk group based on one or more attributes shared by the second plurality of vehicle operators, the second plurality of vehicle operators including at least one vehicle operator not included in the first plurality of vehicle operators;
providing a safe driving group challenge to the first plurality of vehicle operators and to the second plurality of vehicle operators;
capturing, via at least one sensor of an accelerometer and a GPS sensor, vehicle sensor data associated with vehicles operated by the first plurality of vehicle operators and by the second plurality of vehicle operators;
analyzing vehicle sensor data associated with the first plurality of vehicle operators of the first driver risk group to determine a first group challenge performance associated with the first plurality of vehicle operators corresponding to the safe driving group challenge;
analyzing vehicle sensor data associated with the second plurality of vehicle operators of the second driver risk group to determine a second group challenge performance associated with the second plurality of vehicle operators corresponding to the safe driving group challenge;
identifying a first indication of safe driving behavior associated with the first driver risk group based at least in part upon comparing the first group challenge performance and the second group challenge performance; and
presenting the first indication of safe driving behavior to a vehicle operator in the first driver risk group via at least a display associated with the vehicle operator.

20. The computer-readable storage medium of claim 19, the instructions further comprising instructions for:
providing, in response to a query regarding the vehicle operator in the first driver risk group, the first indication of safe driving behavior configured to assist the determination of at least one selected from a group consisting of reward, incentive, and discount for the vehicle operator.

* * * * *